United States Patent Office 3,380,944
Patented Apr. 30, 1968

3,380,944
AMMONIA SOLUBLE RESIN
Daniel J. Kay, Buffalo, and Raymond P. Knipple, North Tonawanda, N.Y., assignors to Hooker Chemical Corporation, Niagara Falls, N.Y., a corporation of New York
No Drawing. Filed Dec. 4, 1964, Ser. No. 416,104
2 Claims. (Cl. 260—28.5)

ABSTRACT OF THE DISCLOSURE

An aqueous emulsion coating composition especially useful in floor polishes, comprising a waxy polymer, a hard polymer derived from an ethylenically unsaturated monomer, an alkali soluble resin, emulsifier and water, said resin and mixture of waxy and hard polymer being present in a weight ratio from about 10:90 to about 70:30, said alkali soluble resin being of the formula

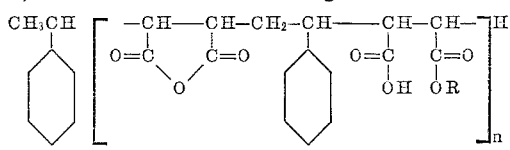

wherein $n$ is a number from 1 to 9 and R is selected from the group consisting of alkyl and alkylene-oxy-alkyl, R contains from 1 to 20 carbon atoms, said alkali soluble resin being prepared by gradually adding a mixture of free radical initiator, styrene and ROH to a solvent solution of maleic anhydride, in the mole ratio of maleic anhydride to styrene of from between about one to 0.7 and about one to 0.85, and in a mole ratio of maleic anhydride to ROH of from between about one to 0.5 and about one to one, at an elevated temperature between about 115 and 180 degrees centigrade until the acid number of the resin is between about 180 and 340, said coating composition having a pH of at least 7.

---

This invention relates to resins which are soluble in aqueous ammonia, for use in emulsion polish systems and to a process for producing such resins. The invention also relates to improved emulsion polish systems.

Emulsion polishes are sometimes referred to as high resin formulas or polymer type formulas. These formulas contain as a principal ingredient, a polymer emulsion, such as an emulsion of a modified polystyrene, a modified polyacrylic, a blend of the two, or a complex styrene acrylic copolymer. The balance of the polish usually comprises a synthetic waxy polymer, an ammonia soluble resin, an emulsifying agent and a diluent comprising water and a basic component such as ammonia or organic amine. Modified polystyrene emulsions are not, in themselves, film formers. Applying an emulsion thereof on a surface normally results in a powdery residue. The use of a plasticizer reduces this tendency to some extent, but does not make the particles sufficiently cohesive to give a continuous film. To insure the proper functioning of the small particle size modified polymer emulsion, it has been found desirable to provide a redispersible film forming matrix therefor.

Ammonia soluble resins and synthetic waxy polymers such as emulsifiable polyethylene, are the major components of such a film forming matrix. The matrix should be water repellent, hard enough to prevent embedment, flexible to prevent surface cracking or glazing, cohesive and adhesive enough to hold the film to the floor surface. The waxy component is dispersed in the water with the aid of emulsifying agent and the basic component. The resin should be soluble in the basic emulsion system wherein it serves to improve the gloss and hardness of the polish and functions as a binder and leveling agent. Many resins have been used as an ammonia soluble resin, including low molecular weight polyols, maleic anhydride and fumaric acid condensation products of polyhydric compounds, shellac and casein. Many of the resins previously employed have resulted in a darkening of the surfaces, such as wood floors and composition floors such as linoleum, rubber or vinyl tile and the like, on which the polish is applied. Likewise, many resins used heretofore have been somewhat deficient in not imparting desired water resistance to the emulsion polishes.

Accordingly, it is an object of this invention to provide an improved ammonia-soluble resin and the use of the resin in emulsion systems as well as a process for producing such a resin. Another object is to provide an emulsion resin that is very light in color. A further object is to provide an emulsion polish which results in a surface of superior water resistance and excellent gloss and hardness. Still another object is to make an emulsion resin that serves as a superior leveling agent in an emulsion polish. Other objects and advantages will become apparent from this specification.

In accordance with this invention there is provided an alkali soluble resin of the formula

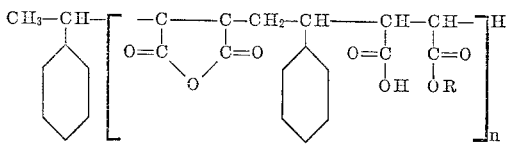

wherein R is selected from the group consisting of alkyl and alkylene-oxy-alkyl, R contains from 1 to 20 carbon atoms and $n$ is a number from 1 to 9. R is derivable from a monohydric alcohol containing 1 to 20 carbon atoms. The preferred alcohols contain from 2 to 18 carbon atoms. Preferably $n$ is a number from 1 to 7.

Suitable alkanols for use in this invention include ethanol, butanol, amyl alcohol, butoxyethanol, ethoxyethanol, methoxyethanol, 2-ethyl hexanol, decyl alcohol and stearyl alcohol.

It is to be appreciated that the molecular weight of the resins of this invention can be varied over a considerable range. The molecular weights may be varied between about 410 and 2,500 and preferably from about 410 to about 1,700.

The resins of this invention are prepared by mixing maleic anhydride in a solvent which is then raised to an elevated temperature. After the maleic anhydride has been dissolved, a mixture of free radical initiator, such as an organic peroxide, styrene and alkanol is gradually added to the anhydride solution. The elevated temperature is maintained and the polymerization is allowed to continue until the desired resin is obtained. The solvent and excess reactants are then removed.

The maleic anhydride, the resulting maleic half ester formed in situ and styrene are reacted in proportions and for such a time that the solid resin product has an acid number (milligrams of potassium hydroxide per gram of resin) of about 180 to about 340. Solid resins having an acid number of about 190 to about 325 are preferred for the preparation of high quality surface coatings.

Any convenient temperature between 115 and 180 degrees centigrade may be employed in preparing the resin of this invention. More desirable is a range between about 125 and about 150 degrees centigrade so that the resin may be readily formed, yet not be discolored by oxidation.

Solvents suitable for use in the process of this invention are solvents having an effective boiling point of at least about 120 degrees centigrade which include aromatics such as ethyl benzene, xylene, p-cymene and cumene; ketones such as methyl amyl ketone, methylisobutyl ketone; acetates such as butyl acetate and amyl acetate; and ethers of ethylene glycol such as ethylene glycol monobutyl ether and ethylene glycol monoethyl ether. Effective boiling temperature is the temperature at which the solvent when in combination with other reactants of this process actually boils.

The ratio of maleic anhydride to styrene is preferably about 1:0.7 on a molar basis although the proportion of styrene may be increased to a ratio of 1:0.85 mole. The maleic anhydride to alkanol ratio is desirably 1 to 0.5 mole. However the molar proportion of alkanol may be increased up to a ratio of about 1:1 but preferably up to about 0.8 mole per mole of maleic anhydride.

The amount of solvent employed in this process may be varied so as to maintain the reaction viscosity at a suitable level. It is desirable that the total solids content of the reaction mixture be maintained from about 20 to about 50 percent by weight. The ratio of solvent to alkanol is desirably from about 8:1 to about 3:1 by weight.

A convenient source of free radicals for polymerizing the mixture of maleic anhydride, maleic half esters and styrene is obtained by the use of an organic peroxide. These peroxides offer a variety of decomposition temperatures, half lifes, and organic residues. Based on weight of the monomer present, the amount of peroxide added may be as low as 1 percent or as high as about 10 percent. Efficient polymerization is obtained by using from about 1.5 to about 9 percent. Suitable organic peroxides include alkylhydroperoxides, for example, tertiary butyl hydroperoxide, pinane hydroperoxide, cumene hydroperoxide, diisopropylbenzene hydroperoxide, p-methane hydroperoxide and para-tertiarybutylcumene hydroperoxide, di-tertiarybutyl peroxide, peroxide derivatives of aldehydes and ketones such as hydroxyheptaldehyde, methylethyl ketone peroxide, methylisobutyl ketone peroxide and cyclohexanone peroxide. Peroxy esters such as tertiary butyl peracetate, tertiary butyl perbenzoate, ditertiary butyl diisopropyl peroxydicarbonate and tertiary butyl permaleic acid are also useful.

Other convenient sources of free radicals for use with the monomers of this invention are the so-called azo catalysts. Catalysts of this group are exemplified by azobisisobutyronitrile.

The resulting resins of this invention are alkali soluble and suitable for use in polish compositions wherein the resins are especially desirable for their film forming properties.

A polish composition of the invention contains in addition to the invented resins, a waxy polymer such as polyethylene or polypropylene, hard polymers such as vinyl chloride, polyacrylic resin or polystyrene, which are derived from ethylenically unsaturated monomers, leveling agents, materials to reduce slipperiness, compounds to improve gloss, emulsifiers, alkaline materials and water as the polish solvent. Generally, the total solids content of the polish ranges from about 6 to about 25 percent by weight of the composition, while the preferred total solids content of the polish is from about 9 to about 18 percent. The remainder of the composition is generally aqueous and usually is water.

The invented resins may constitute from 10 to about 70 percent by weight of the total solids in the polish compositions. Particularly good results are obtained when from about 15 to about 60 percent of the total solids content of the polish are the invented resins. The balance of the total solids is composed of polyethylene and polymers derived from ethylenically unsaturated monomers such as polystyrene or polyvinylacrylic, the amount of polystyrene usually being in excess to the amount of polyethylene present.

The final water emulsion polish composition of the invention is normally prepared by making a water solution of the resin portion, a water emulsion of a polyethylene portion, and a water emulsion of the polystyrene portion, separately, and then mixing them together to provide the final composition. In order to improve storage stability, the water emulsion polish composition is usually adjusted to a pH of at least seven and more usually to a pH from about 7.5 to about 10.

The term "soluble" as employed in this disclosure is intended to include the concept of dispersible material in the solvent as well as complete dissolving of the material in the solvent.

RESIN SOLUTION

A solution of the invented ammonia soluble resin is readily prepared for use in a polish emulsion system. In a typical preparation, 100 parts of an ammonia soluble resin and 500 parts of water are charged to a vessel which will not permit loss of volatile materials. While agitating the mixture in the vessel, about 50 parts of a 28 percent ammonium hydroxide solution is added to the vessel and agitation is continued until the solution of the resin is complete. Gentle heating may be employed to speed the solubilization. In the preparation of the resin solution, the ammonia may be replaced in whole or in part by other alkaline materials such as volatile organic amines. Suitable volatile organic amines include the aliphatic and hydroxy aliphatic amines having boiling points below about 200 degrees centigrade at a pressure of 760 millimeters of mercury, for example, morpholine, ethoxypropylamine, 2-amino-2-methyl-1-propanol ethanolamine, dimethylolamine, ethylene diamine and triethylolamine. The resin solutions generally contain from about 5 to 25 percent solids, preferably about 15 to 20 percent solids.

POLYETHYLENE EMULSION

A typical polyethylene wax emulsion is prepared by melting 13.9 parts of AC polyethylene 629, a well known low molecular weight polyethylene wax, melting point— 213–221 degrees Fahrenheit, manufactured by Allied Chemical Corporation, New York, N.Y., at a temperature not exceeding 270 degrees Fahrenheit. To the melted wax, 2.1 parts of oleic acid are added with agitation and the mixture is reheated to 230 degrees Fahrenheit and agitated until it is uniformly fluid whereupon 2.4 parts of morpholine is added. The resulting mixture is reheated to 250 degrees Fahrenheit and agitation is continued until a uniform blend is produced. The resulting mixture was added to 81.5 parts of water just below 212 degrees Fahrenheit and the emulsion is quickly cooled to room temperature with agitation.

POLYMER EMULSION

The polymer emulsion or latex, as heretofore noted, may contain polystyrene, polyvinyl chloride, or polyacrylic resins. Particularly suited to the polish compositions of this invention are those polystyrene resins having a molecular weight of above 5,000, preferably those having a molecular weight above 100,000. Generally, these emulsion polymers have molecular weight below 600,000. These aqueous emulsions are used to provide high gloss, durability and toughness.

A typical polymer emulsion is prepared by charging into an enclosed mixing vessel 34.9 parts of U-2003 Ubatol, a polystyrene product manufactured by the UBS Chemical Corporation, Cambridge, Mass. With moderate agitation 11.5 parts of water is added to the vessel and mixing is continued until the mixture is uniform, whereupon a solution of polish plasticizing agents comprising 1.1 parts of dibutyl phthalate and 0.8 part of trisbutoxyethylphosphate and 51.6 parts of water is added to the vessel. Agitation is then continued for 20 minutes.

The practice of this invention is illustrated but not limited by the examples given below. Temperatures are expressed in degrees centigrade and all parts are by weight unless otherwise noted.

RESIN PREPARATION

Example 1

To a 12 liter 3-necked flask equipped with a stirrer, trap, vertical water cooled condenser thermometer and addition separatory funnel was charged 1372 parts of maleic anhydride, and 3,692 parts of xylene. The ingredients in the flask are heated with a mantle to 130 degrees centigrade to dissolve the solid. A solution of 1,016 parts of styrene, 105 parts of di-tertiary butyl peroxide and 518 parts of butyl alcohol was added gradually over four hours thru the dropping funnel to the reaction mixture held at 135–140 degrees (mild reflux). The reaction temperature was maintained for an additional 15 minutes. The water condenser was then connected to the flask in an oblique position and a distillate receiver attached to the condenser. Vacuum was gradually applied to the resin solution and the solvent was stripped off with temperature being maintained below 140 degrees. After most of the solvent was removed the resin temperature was increased to about 170–175 degrees centigrade and vacuum increased to 27–29 inches of mercury to remove the last traces of solvent. When a fairly complete removal of the distillate was achieved, the vacuum treatment was discontinued, and the resin was poured into a shallow tray for rapid cooling.

Brittle resin test data: acid number—244; melt point—

COMMERCIAL RESIN

A commercially available polyester resin based on wood resin has an acid number of 130 and an ammonia solution of this resin has a pH of 8.8, a Gardner-Holdt viscosity of $A_3$, a Gardner color of 10 and a clear appearance.

Water emulsion coating compositions were proposed for the coating of linoleum tile. In each case, the coating composition was prepared by stirring together the desired amount of polyethylene emulsion and polystyrene emulsion and thereafter adding the ammonia soluble resin portion. If desired, all three components of the coating solution may be blended simultaneously; however, it has been found convenient to blend the coating compositions in two steps.

The compositions were applied under regular test procedures to the test linoleum tiles and the following observations were made with respect to the coatings as they were being applied and the coatings after they had been dried. The leveling abilities of the coatings, to spread out and to avoid patches of different thicknesses, were observed as the coatings were put onto the tiles. The gloss of each coating was determined as dried, without buffing. The abilities to resist water spotting after drying were determined. Additionally, the abilities of second or subsequent polish coats to blend in with the previous coats were observed.

TABLE I.—POLISH COMPOSITIONS

| Example | Resin Solution of Example No. | Polish Composition [1] | | | Gloss | Leveling | Water Resistance | Effect Applying 2nd Coat |
| --- | --- | --- | --- | --- | --- | --- | --- | --- |
| | | Resin Solution | Polyethylene Wax Emulsion | Polymer Emulsion | | | | |
| 5 | 1 | 25 | 10 | 65 | Good | Good | Fair | Good. |
| Comparative: | | | | | | | | |
| 6 | Commercial Resin | 40 | 10 | 50 | ___do | ___do | ___do | Moderately Dull. |
| 7 | ___do | 30 | 25 | 45 | Fair | ___do | ___do | Slightly Dull. |

[1] Parts by weight, 16% Total solids.

113 degrees; color (Gardner)—4, specific viscosity (15 percent by weight in methylethylketone) 1.24. An ammonia-water solution of this resin at 16% solids showed the following: 23 milliliters of 28% ammonium hydroxide per 50 grams of resin; Gardner-Holdt viscosity—$A_3$; Gardner color—4; pH—8.0; appearance—clear.

Additional resins of the invention were prepared in a manner similar to the process of Example 1. In Examples 2, 3 and 4 the reactants and amounts are the same as Example 1 unless otherwise indicated.

Example 2

Amyl alcohol (616 parts) was used in this example. Brittle resin test data: acid number—275, melting point—124 degrees centigrade, and Gardner color—5. Ammonia-water solution, 16 percent solids, test data: Gardner-Holdt viscosity—$A_3$, Gardner color—4 to 5, pH—7.6 and appearance clear.

Example 3

The alkanol used in this example was 2-ethyl hexyl alcohol (910 parts). Brittle resin test data: acid number—315, melting point—100 degrees centigrade, and Gardner color—3. Ammonia-water solution, 16 percent solids, test data: Gardner-Holdt viscosity—$A_3$, Gardner color—3 to 4, pH—9.2 and appearance clear.

Example 4

Butanol (1,042 parts) and tertiarybutyl perbenzoate (52 parts) were used in this example. Brittle resin test data: acid number 231, melting point—109 degrees centigrade, and Gardner color—5. Ammonia-water solution, 16 percent solids, test data: Gardner-Holdt viscosity—$A_3$, Gardner color number—5, pH 8.2 and appearance semi-clear.

The coating results show that the gloss and leveling properties were equivalent to the control. Additionally, effects due to polish recoating and water resisance were about equivalent, both being satisfactory. Improved surface hardness and toughness were indicated on the coatings of this invention. This increased hardness is desirable since the harder the surface the less the dirt pick-up will be. Coating compositions containing the resins of this invention were noticeably lighter in color than the coatings based on rosin polyesters.

Various changes and modifications may be made in the method and apparatus of this invention and in the mole ratios of the resins of this invention, certain preferred ones of which have been herein described, without departing from the spirit and scope of this invention.

What is claimed is:

1. An aqueous emulsion coating composition comprising a waxy polymer, a hard polymer derived from an ethylenically unsaturated monomer, an alkali soluble resin, emulsifier and water, said resin and mixture of waxy and hard polymer being present in a weight ratio from about 10:90 to about 70:30, said alkali soluble resin being of the formula

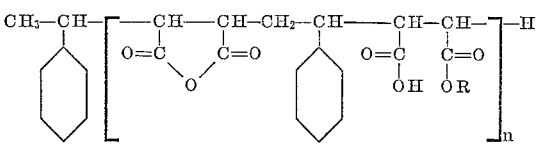

wherein $n$ is a number from 1 to 9 and R is selected from the group consisting of alkyl and alkylene-oxy-alkyl, R contains from 1 to 20 carbon atoms, said alkali soluble resin being prepared by gradually adding a mixture of free radical initiator, styrene and ROH to a solvent solution of maleic anhydride, in the mole ratio of maleic anhydride to styrene of from between about one to 0.7 and about one to 0.85, and in a mole ratio of maleic anhydride to ROH of from between about one to 0.5 and about one to one, at an elevated temperature between about 115 and 180 degrees centigrade until the acid number of the resin is between about 180 and 340, said coating composition having a pH of at least 7.

2. An aqueous emulsion coating composition according to claim 1 wherein R is butyl.

References Cited
UNITED STATES PATENTS

| | | | |
|---|---|---|---|
| 2,640,819 | 6/1953 | Barrett | 260—78.5 |
| 3,234,158 | 2/1966 | Pfluger et al. | 260—29.6 |
| 3,342,787 | 9/1967 | Muskat | 260—78.5 |

MURRAY TILLMAN, *Primary Examiner.*

SAMUEL H. BLECH, *Examiner.*

W. J. BRIGGS, *Assistant Examiner.*